US009504944B2

(12) United States Patent
Aubrey et al.

(10) Patent No.: US 9,504,944 B2
(45) Date of Patent: Nov. 29, 2016

(54) BN OR $Y_2O_3$ COATED CERAMIC FILTERS USED IN FILTRATION OF ALUMINUM—LITHIUM ALLOYS AND REACTIVE ALLOYS

(71) Applicant: Porvair PLC, Norfolk (GB)

(72) Inventors: Leonard S. Aubrey, Hendersonville, NC (US); Feng Chi, Hendersonville, NC (US); Lucas Damoah, Hendersonville, NC (US)

(73) Assignee: Porvair Plc, Norfolk (GB)

( * ) Notice: Subject to any disclaimer, the term of this patent is extended or adjusted under 35 U.S.C. 154(b) by 217 days.

(21) Appl. No.: 14/296,922

(22) Filed: Jun. 5, 2014

(65) Prior Publication Data

US 2014/0360316 A1    Dec. 11, 2014

Related U.S. Application Data

(60) Provisional application No. 61/831,774, filed on Jun. 6, 2013, provisional application No. 61/898,239, filed on Oct. 31, 2013.

(51) Int. Cl.
| | | |
|---|---|---|
| *C22B 26/22* | (2006.01) | |
| *C22B 21/06* | (2006.01) | |
| *C22B 9/02* | (2006.01) | |
| *B01D 46/00* | (2006.01) | |
| *B01D 39/20* | (2006.01) | |

(52) U.S. Cl.
CPC .......... *B01D 39/2075* (2013.01); *C22B 9/023* (2013.01); *C22B 21/066* (2013.01); *C22B 26/22* (2013.01); *B01D 2239/0485* (2013.01); *B01D 2239/1241* (2013.01); *Y02P 10/234* (2015.11)

(58) Field of Classification Search
CPC ..... C22B 9/023; C22B 21/066; C22B 26/22; B01D 46/0001; B01D 39/2068; B01D 39/2093

See application file for complete search history.

(56) References Cited

U.S. PATENT DOCUMENTS

| | | | | |
|---|---|---|---|---|
| 4,056,586 | A * | 11/1977 | Pryor ................. | B01D 39/2093 264/43 |
| 5,456,833 | A * | 10/1995 | Butcher ............. | B01D 39/2093 210/488 |
| 5,580,837 | A | 12/1996 | Dodds et al. | |
| 5,876,537 | A * | 3/1999 | Hill .................... | B01D 39/2086 156/173 |
| 8,039,086 | B2 * | 10/2011 | Tomita ............... | B01D 46/0001 428/116 |
| 2003/0150294 | A1 | 8/2003 | Stefansson et al. | |

(Continued)

FOREIGN PATENT DOCUMENTS

DE        102006056427      *  5/2008

OTHER PUBLICATIONS

Frenzer et al. DE 102006056427. Published May 2008. Machine translation of the description.*

*Primary Examiner* — George Wyszomierski
*Assistant Examiner* — Tina M McGuthry Banks
(74) *Attorney, Agent, or Firm* — Joseph T. Guy; Perkins Law Firm, LLC (57) ABSTRACT

A filter which is particularly suitable for filtration of molten metal, and method of making the filter, is described. The filter comprises a ceramic core comprising a primary component selected from the group consisting of alumina and magnesium oxide. A coating is on the ceramic core wherein the coating is selected from the group consisting of BN and $Y_2O_3$.

28 Claims, 6 Drawing Sheets

(56) References Cited

U.S. PATENT DOCUMENTS

2006/0236790 A1 10/2006 Dion
2008/0163999 A1 7/2008 Hymas et al.
2010/0113244 A1 5/2010 Chi et al.
2012/0144958 A1 6/2012 Olson, III et al.

* cited by examiner

BN OR Y₂O₃ COATED CERAMIC FILTERS USED IN FILTRATION OF ALUMINUM—LITHIUM ALLOYS AND REACTIVE ALLOYS

CROSS-REFERENCE TO RELATED APPLICATIONS

This application claims priority to pending U.S. Provisional Patent Appl. No. 61/831,774 filed Jun. 6, 2013 and to pending U.S. Provisional Patent Appl. No. 61/898,239 filed Oct. 31, 2013 both of which are incorporated herein by reference.

BACKGROUND

The present invention is related to improved ceramic filters particularly suitable for filtration of aluminum and magnesium based alloys. More specifically, the present invention is related to ceramic foam filters with either BN or $Y_2O_3$ coatings to improve resistance to chemical reactivity.

Commercial aluminum-lithium (Al—Li) alloys are used primarily in aerospace applications because of their low density, high specific modulus, excellent cryogenic toughness and superior fatigue crack growth resistance. Each 1 weight % addition of lithium can reduce the density of an AL-Li alloy by about 3% and increase its stiffness by about 5%.

Commercial magnesium alloys are finding acceptance in the transportation industry and particularly the automotive sector. Magnesium alloys typically have a lower density than aluminum alloys and have high specific stiffness.

It is typically desirable to filter the alloy during the molten state to remove either solid or liquid insoluble second phase impurities. Ceramic filters are used widely in removing inclusions from molten aluminum alloys. Traditional ceramic foam materials used for filtering aluminum alloys include aluminum phosphate bonded alumina, sinter-bonded alumina and boron glass bonded kyanite. Lithium is one of the most reactive alkali metals and will reduce almost any of the common oxide materials, except yttrium oxide and calcium oxide, at high temperature according to the Ellingham free energy diagram. Corrosive attack by lithium alloying additions is accelerated by the high vapor pressure of lithium. Corrosion attack of the filter material can occur before the onset of wetting due to lithium vapor infiltration into the filter microstructure. When added to molten aluminum, lithium has a high tendency to react with oxygen and nitrogen at the molten metal-air interface and to form lithium oxide, lithium aluminate and lithium nitride inclusions. Lithium oxide destabilizes the normally protective aluminum oxide film on the molten aluminum surface, resulting in accelerated oxidation and the formation of inclusions. Traditional ceramic foam materials, including sinter-bonded alumina, when used in Al—Li alloy filtration, are severely attacked by reactive lithium, and can break down in the filtering process, potentially resulting in filter fragments and inclusion releases from the filter structure. The chemically attacked ceramic filter surface eventually becomes wetted by the molten Al—Li alloy due to surface reactions and filter surface starts to corrode away. When this occurs, inclusion adherence and stable separation of inclusion material at the surface will no longer occur.

Calcium oxide should not be reduced by lithium based on the Ellingham free energy diagram and should be stable in aluminum lithium alloy. Unfortunately, calcium oxide is very hydroscopic and a filter made of calcium oxide will likely react with moisture in air to form calcium hydroxide, making the filter un-useable. Magnesium oxide according to the Ellingham Free Energy diagram should be stable in Al—Li alloys. However, if the starting MgO powders used in the filter slurry contain a significant level of impurities, the resulting MgO filters may have reduced corrosion resistance to molten Al—Li alloys.

Magnesium alloys are also very reactive in the liquid state. Magnesium also has a high vapor pressure and the reactivity of the vapor is enhanced relative to the liquid state. Sinter-bonded alumina, aluminum phosphate bonded alumina, boron glass bonded kyanite and zirconium oxide ceramic filters cannot be used in molten magnesium alloy filtration due to the aggressive reactivity, particularly, of the magnesium vapor.

There is a need for an improved material for filtering aluminum and magnesium based alloys and particularly Al—Li alloys, Mg-containing aluminum alloys and other reactive alloys such as titanium and titanium aluminides.

SUMMARY OF THE INVENTION

It is an object of the invention to provide an improved filter, particularly, a filter suitable for filtering aluminum and magnesium alloys.

It is another object of the invention to provide a filter comprising a boron nitride or yttrium oxide coating to prevent chemical reaction between the filter and the components of the molten metal alloy being filtered.

A particular feature of the present invention is the ability to prevent chemical attack of the filter microstructure by the high vapor pressure reactive alloy components, specifically, lithium or magnesium.

These and other advantages, as will be realized, are provided in a filter particularly suitable for filtration of molten metal. The filter comprises a ceramic core comprising a primary component preferably selected from the group consisting of alumina, magnesium oxide and SiC. A coating is on the ceramic core wherein the coating is selected from the group consisting of BN and $Y_2O_3$.

Yet another embodiment is provided in a method for filtering molten metal. The method comprising providing a filter wherein the filter comprises a ceramic core with a primary component preferably selected from the group consisting of alumina, magnesium oxide and SiC. A coating is on the ceramic core wherein the coating is selected from the group consisting of BN and $Y_2O_3$. Molten metal is passed through the filter wherein the molten metal comprises an alloy of aluminum or an alloy of magnesium.

Yet another embodiment is provided in a method for making a filter. The method includes forming a slurry comprising a ceramic precursor preferably selected from the group consisting of alumina and magnesium oxide. An open cell foam is impregnated with the slurry to form an impregnated foam. The impregnated foam is heated to vaporize the open cell foam and sinter the ceramic precursor thereby forming a ceramic foam. The ceramic foam is coated with a slurry comprising a material selected from the group consisting of BN and $Y_2O_3$ forming a slurry ceramic foam.

DESCRIPTION

The present invention is related to BN or Y$_2$O$_3$-coated ceramic filters where the coating protects the underlying substrate ceramic material from attack by reactive lithium in Al—Li or by reactive elements such as magnesium in magnesium alloys or magnesium in Mg-containing aluminum alloys. More specifically, the present invention is related to a filter particularly suitable for filtration of Al—Li alloys, Mg-containing aluminum alloys and titanium aluminide alloys.

The inventive filters comprise a ceramic core with boron nitride or yttrium oxide coating thereon.

The initial ceramic core is formed by coating a reticulated polyurethane precursor with ceramic slurry. The reticulated open cell foam, preferably polyurethane foam, is impregnated with the ceramic slurry wherein, preferably, the entire structure of the reticulated open cell foam is coated with slurry. The pore size of the foam is preferably between about 10 and about 70-ppi. The impregnated foam is preferably compressed to expel from 25 to 85% of the slurry while leaving the polyurethane struts coated. In a commercial production operation, the impregnated foam may be passed through one or more preset roller(s) to affect the desired expulsion of slurry from the foam leaving the desired amount of coating on the polyurethane precursor.

The impregnated foam is then heated to a degree sufficient to remove any free water in order to dry the slurry. The dry impregnated polyurethane is then fired to a high temperature to develop a ceramic bond. The resulting ceramic foam is essentially a connection of struts with internal porosity left from the polyurethane foam burning out during the firing process. This technique is widely known in the art. The process for forming a ceramic filter is provided in U.S. Pat. Nos. 4,056,586; 5,456,833 and 5,673,902, each of which are incorporated herein by reference.

The free water in the impregnated foam is then removed by drying at a temperature of from 35° to 200° C. for from 2 minutes to 6 hours. After drying, the material is heated at an elevated temperature to bond, or sinter, the ceramic particles making up the filter web structure. This second stage is to heat to a temperature of from 900° to 1700° C. and the temperature is held in this range for from 2 minutes to 10 hours in order to bond the ceramic. The resulting product is a fused ceramic foam having an open cell structure characterized by a plurality of interconnected voids surrounded by a web of the ceramic. The ceramic foam may have any desired configuration based on the configuration needed for the particular molten metal filtration process.

The ceramic precursor comprises a primary component selected from the group consisting of either alumina (Al$_2$O$_3$) or magnesium oxide. Preferably, the primary component represents at least 50 wt. % of the ceramic core and more preferably at least 75 wt. % to no more than 99.5 wt. %. Even more preferably, the primary component represents at least 90 wt. % to no more than 99.5 wt. % of the ceramic core. The core is preferably selected from sinter-bonded alumina, aluminum phosphate bonded alumina, boron glass bonded kyanite or silicon carbide (SiC) with the boron nitride or yttrium oxide coating thereon. Particularly preferred ceramic core is provided by a ceramic precursor selected from kyanite, mullite, silica or other silica containing materials.

It is known to form alumina as either a sinter bonded alumina or aluminum phosphate bonded alumina. These materials were not previously considered suitable for filtration of aluminum-lithium or magnesium alloys based on reactivity as mentioned above. With the incorporation of a boron nitride or yttrium oxide coating the reactivity between the core ceramic and components of the filtered metal is mitigated thereby allowing for the use of materials otherwise considered unsuitable as the core ceramic.

The slurry employed depends on the desired ceramic material for the chosen application. The eventual ceramic must have sufficient properties in the final product to withstand the particular application and must have sufficient structural and/or mechanical strength to stand up to elevated temperature conditions of use. In addition, the slurry preferably has a thixotropic rheology, is flowable during slurry impregnation, and most preferably comprises a liquid suspension of the ceramic precursor intended for firing to form the filter. Normally, the slurry contains a dispersive liquid and solvent phases such as water. Additives, such as binders, surfactants and thickeners, which are preferably volatile at firing, are employed in the slurry to alter viscosity, wetting characteristics or rheological property. Additional solvents, surfactants, flow aids, dispersing aids, sintering aids and the like are mentioned as being particularly suitable for use.

Sintering aids assist in the sintering and may be employed. Exemplary sintering aids include magnesium oxide for sintering alumina ceramics, and lithium oxide and boron oxide for sintering magnesia ceramics etc.

The impregnated foam is either formed to size prior to firing or cut to size after heating or firing. The material can be cut to size as a green ceramic or as a sintered ceramic.

After formation of the ceramic filter, an Y$_2$O$_3$ or boron nitride coating is applied to the fired ceramic filter and particularly the filters with the alumina core. The coating covers at least 90% of the surface area of the ceramic filter and preferably at least 95%. It is most preferable for the coating to cover 100% of the surface area as any uncovered ceramic is susceptible to chemical attack.

The instant filters are particularly suitable for filtering pure aluminum or aluminum alloys designated by Group 1xxx through Group 8xxx as defined in the "Recommendations of the International Designation System for Wrought Iron and Wrought Iron Alloys" in *International Alloy Designations And Chemical Composition Limits For Wrought Aluminum And Wrought Aluminum Alloys*, The Aluminum Association, 1525 Wilson Boulevard, Arlington, Va. 22209, revised April 2006, which is incorporated herein by reference. Included in the aluminum alloys are at least silicon, iron, copper, manganese, magnesium, lithium, chromium, nickel, zinc, bismuth, lead, zirconium, titanium, beryllium and boron with trace amounts of other elements.

Y$_2$O$_3$ has one of the highest thermodynamic stability and is one of most stable oxides. With a melting temperature of 2,400° C., it has superior resistance to chemical attack by highly reactive molten metals, such as lithium at high temperature. Yttrium oxide ceramic filter is a potential filter material for aluminum-lithium alloy filtration, except it is expensive due to the raw material cost. Rare Earth oxides, and particularly lanthanide and cerium oxides are contemplated herein for use in a ceramic filter, preferably, as a coating.

To make yttrium oxide coatings less porous, fine yttrium oxide powder, preferably less than 2 micron in size, is desired. It is preferable that the yttrium oxide have a particle size of at least 0.01 microns due to handling difficulties with smaller particles.

Boron nitride has excellent thermal and chemical stability. Boron nitride is non-wetted by molten aluminum and magnesium alloys. The suitable form of boron nitride has a hexagonal platelet shape similar to graphite. While not limited to any theory it is hypothesized herein that the hexagonal plates of boron nitride form parallel interlocking layers on the surface of the core ceramic filter. The parallel layers of hexagonal boron are believed to form a highly non-wetting vapor barrier which prohibits vaporized reactive species, such as lithium and magnesium, from reaching the ceramic. Whereas the prior art was concerned with the liquid reactivity, which can be mitigated by insuring non-wettability of the surface, the reactive vapors were not adequately addressed. The hexagonal plates are non-wetting and provide an effective vapor barrier.

The boron nitride or yttrium oxide are typically applied to the filter as a water based slurry.

Boron nitride coating materials are available commercially from ZYP Coatings Inc. (Grade Lubricoat Blue) or Momentive Specialty Chemicals, Inc. as a water based paint slurry. The particle size of the boron nitride is preferably at least 1 micron to no more than 15 microns. Above about 15 microns the platelets may span across surface undulations or pores thereby decreasing the effective porosity. The preferred particle size is about 5 to about 14 microns.

The layer thickness of the coating is preferably just large enough to insure adequate vapor protection and above that threshold the additional material used provides no benefit and therefore is preferably avoided. The layer thickness is preferably at least 1 micron to no more than 200 microns for. For boron nitride the layer thickness is at least 1 micron to no more than 50 microns. For $Y_2O_3$ the layer thickness is preferably at least 2 microns no more than 50 microns.

The coating is preferably applied by dipping the filter into the coating suspension of either the BN or $Y_2O_3$ slurry. After the suspension has partially drained from the filter it is then placed in a spin coater and spun at a high rpm to force any remaining excess coating suspension from the filter. The thickness of the coating can be controlled by the spin coater's rpm, the coating slurry's solid loading and the spinning cycle. After the coating operation, coated filters are placed in a dryer to remove water at a temperature of about 50° C. to about 200° C. The filter is then heated to remove volatile components of the suspension and, if necessary, to volatilize organic components and to make a strong bond between the coating materials and the ceramic substrate. The temperature for formation of the coating is preferably at least 300° C. to no more than 800° C. for BN coating. Below about 300° C. the layer formed may not have sufficient strength and above about 800° C. the BN coated layer may begin to oxidize. For yttrium oxide coating, the temperature for formation of the coating is about 1200° C. for two hours. At higher temperature, such as 1500° C., yttrium oxide will react with the underline ceramic substrate and form a second phase which decreases the effectiveness as a protective coating.

The coating is preferably spin coated to spread the coating throughout the ceramic foam wherein a suspension of either the BN or $Y_2O_3$ is applied to the ceramic filter and the filter is spun at a high rate of speed thereby forcing, by centrifugal force, the suspension into and through the ceramic foam thereby coating, preferably, the entire surface of the ceramic struts with suspension. The filter is then heated to remove volatile components of the suspension and, if necessary, to volatilize organic components. The spinning is accomplished at a rotation rate dependent on the radius of rotation at the filter. For conventional commercially available spin coaters the rotational rate is at least 200 rpm to no more than 3000 rpm based on a drum with an average diameter of 762 mm (30 inches). Below about 200 rpm insufficient penetration and coverage is obtained. Above about 3000 rpm there is no further benefit. A range of about 1000-2100 rpm is adequate for demonstration of the invention in most embodiments based on a drum with an average diameter of 762 mm (30 inches). One of skill in the art could easily adjust the rotation rate for different drum sizes.

EXAMPLES

Alumina filters with an average pore size of 30 pores per inch (ppi) were made from a high purity alumina slurry. The fired alumina filters had a relative density ranging between 10 to 12% and with 99.5% purity alumina. The fired alumina filters were fully immersed in a BN slurry and then were placed in a spin coater to subject a centrifugal force to have excessive BN slurry removed. After the coating process the filters were dried at 66° C. and fired at 450° C. for two hours. The BN slurry was from Momentive Specialty Chemicals, Inc. (Grade TPC). The Grade TPC BN paint was diluted by deionized water with 2 parts paint to 1 part water.

Magnesia filters with an average pore size of 35-ppi were made from a high purity magnesia slurry. The fired filters have a relative density range of between 9% to 12%. Fired MgO filters were fully immersed into a yttrium oxide slurry and then placed in a coater to remove excessive yttrium oxide slurry. Coated filters were dried at up at 66° C. and fired at about 1200° C. for two hours. The coating yttrium oxide slurry was made from diluted "Type Y", available from ZYP® Coatings diluted at a ratio of 3 paint to 1 Di-water.

The samples were subjected to a corrosion tests wherein the ceramic filters being tested were dynamically tested in molten Al—Li alloy with 2 wt. % Li for three hours at 700° C. under argon protection. The attached figures show SEM backscattered electron images of the sectioned, mounted and polished filter sections showing the improvement achieved with BN and $Y_2O_3$ coatings.

Figure 1:
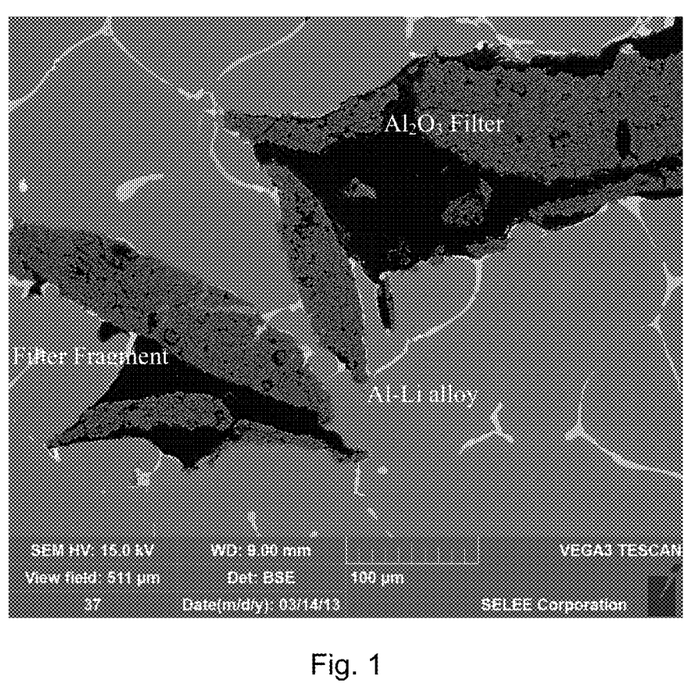
FIG. 1 is an SEM image of a polished cross-section of an alumina filter used to filter molten Al—Li.

FIG. 1 is a scanning electron micrograph (SEM) of an alumina filter after corrosion testing. The image illustrates that the Al—Li alloy wetted, reacted with and fractured the ceramic filter structure.

Figure 2:
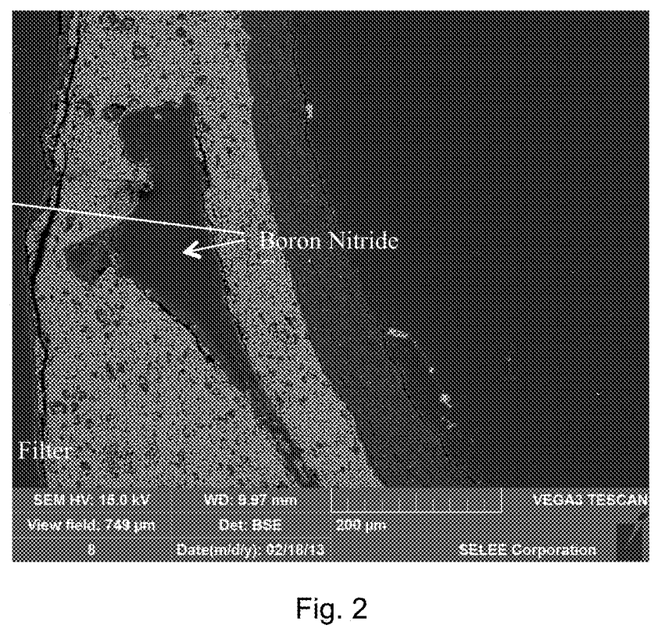
FIG. 2 is an SEM image of a polished cross-section of a boron nitride coated alumina filter used to filter molten Al—Li.

FIG. 2 is a scanning electron micrograph of the boron nitride coated alumina filter after corrosion testing showing the alumina filter structure was well protected by the boron nitride.

Figure 3:
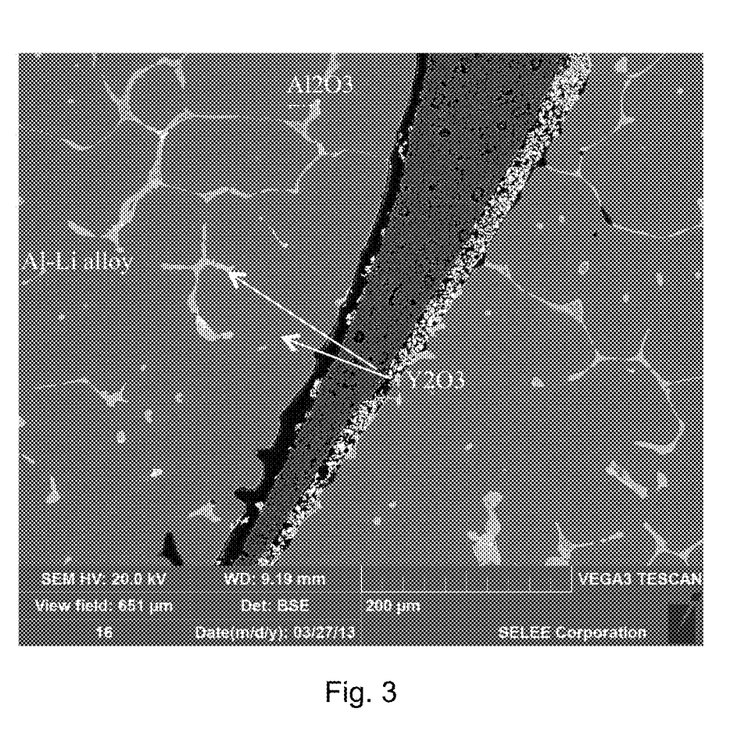
FIG. 3 is an SEM image of a polished cross-section of a Y$_2$O$_3$ coated alumina filter used to filter molten Al—Li.

FIG. 3 is scanning electron micrograph of the $Y_2O_3$ coated alumina filter after corrosion testing showing one side of an alumina strut protected by $Y_2O_3$ and another side illustrating non-wetting of the molten aluminum alloy metal in the presence of the $Y_2O_3$.

Figure 4:
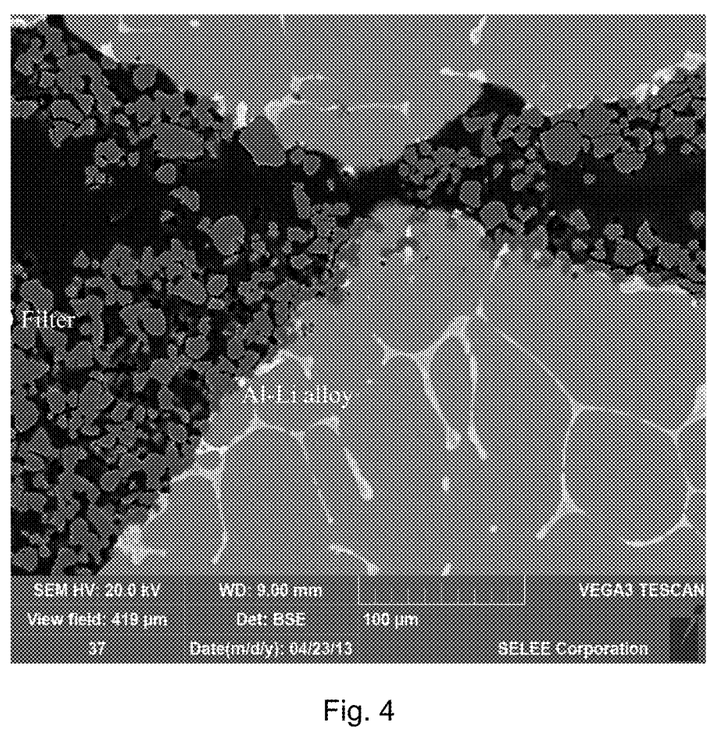
FIG. 4 is an SEM image of a polished cross-section of a magnesium oxide filter used to filter molten Al—Li.

FIG. 4 is a scanning electron micrograph of the magnesium oxide filter after corrosion testing showing some reactive wetting of the Al—Li alloy on the surface of the MgO filter.

Figure 5:
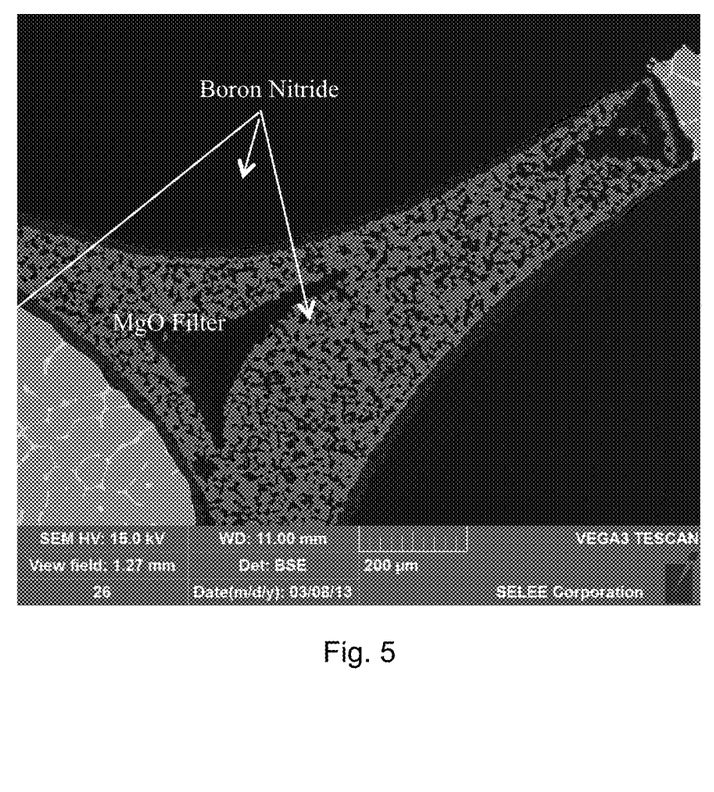
FIG. 5 is an SEM image of a polished cross-section of a boron nitride coated magnesium oxide filter used to filter molten Al—Li.

FIG. 5 is a scanning electron micrograph of the boron nitride coated magnesium oxide filter after corrosion testing in Al—Li showing nearly complete protective of the MgO filter by the boron nitride coating.

Figure 6:
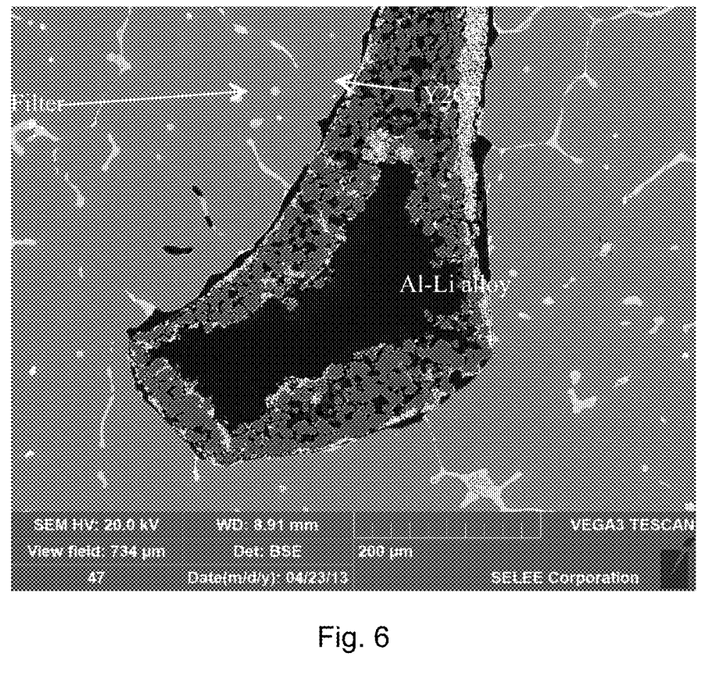
FIG. 6 is an SEM image of a polished cross-section of an Y$_2$O$_3$ coated magnesium oxide filter used to filter molten Al—Li.

FIG. 6 is a scanning electron micrograph of the $Y_2O_3$ coated magnesium oxide filter after corrosion testing showing the magnesium oxide filter is protected by the $Y_2O_3$ coating.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A filter particularly suitable for filtration of molten metal wherein said filter comprises:
   a ceramic core comprising a primary component wherein said primary component is selected from the group consisting of sinter bonded alumina, aluminum phosphate bonded alumina, glass bonded alumina and glass bonded SiC; and
   a coating on said ceramic core wherein said coating is selected from the group consisting of BN and $Y_2O_3$ wherein said ceramic core has a surface area and said coating covers at least 90% of said surface area.

2. The filter of claim 1 wherein said coating covers at least 95% of said surface area.

3. The filter of claim 2 wherein said coating covers 100% of said surface area.

4. The filter of claim 1 wherein said BN comprises hexagonal BN.

5. The filter of claim 4 wherein said hexagonal BN has a particle size of at least 1 micron to no more than 15 microns.

6. The filter of claim 5 wherein said hexagonal BN has a particle size of at least 5 micron to no more than 14 microns.

7. A filter particularly suitable for filtration of molten metal wherein said filter comprises:
   a ceramic core comprising a primary component; and
   a coating on said ceramic core wherein said coating is selected from the group consisting of BN and $Y_2O_3$ wherein said ceramic core has a surface area and said coating covers at least 90% of said surface area wherein said coating has a thickness of at least 1 micron to no more than 200 microns.

8. A filter particularly suitable for filtration of molten metal wherein said filter comprises:
   a ceramic core comprising a primary component; and
   a coating on said ceramic core wherein said coating is BN with a coating thickness of at least 1 microns to no more than 50 microns.

9. A filter particularly suitable for filtration of molten metal wherein said filter comprises:
   a ceramic core comprising a primary component; and
   a coating on said ceramic core wherein said coating is $Y_2O_3$ with a coating thickness of at least 2 microns to no more than 50 microns.

10. A filter particularly suitable for filtration of molten metal wherein said filter comprises:
    a ceramic core comprising a primary component; and
    a coating on said ceramic core wherein said coating is selected from the group consisting of BN and $Y_2O_3$ wherein said ceramic core has a surface area and said coating covers at least 90% of said surface area with an average pore size of at least 10 ppi to no more than 70 ppi.

11. A method for making a filter comprising:
    forming a slurry comprising a ceramic precursor;
    impregnating an open cell foam with said slurry to form a impregnated foam;
    heating said impregnated foam to vaporize said open cell foam and sinter said ceramic precursor forming a ceramic foam;
    coating said ceramic foam with a slurry comprising a material selected from the group consisting of BN and $Y_2O_3$ forming a slurried coated ceramic foam; and
    drying said slurry coated ceramic foam to form said filter.

12. The method for making a filter of claim 11 wherein said ceramic precursor is selected from the group consisting of alumina, magnesium oxide and SiC.

13. The method for making a filter of claim 12 wherein said ceramic precursor comprises a material selected from the group consisting of mullite, kyanite and SiC.

14. The method for making a filter of claim 12 wherein said ceramic precursor comprises a material selected from the group consisting of sinter bonded alumina, aluminum phosphate bonded alumina, glass bonded kyanite and glass bonded SiC.

15. The method for making a filter of claim 11 further comprising spinning said slurry coated ceramic foam to spread said slurry composition on said ceramic foam forming a slurry coated ceramic foam.

16. The method for making a filter of claim 11 wherein said ceramic foam has a surface area and said coating covers at least 90% of said surface area.

17. The method for making a filter of claim 16 wherein said coating covers at least 95% of said surface area.

18. The method for making a filter of claim 17 wherein said coating covers 100% of said surface area.

19. The method for making a filter of claim 11 wherein said BN comprises hexagonal BN.

20. The method for making a filter of claim 19 wherein said hexagonal BN has a particle size of at least 1 micron to no more than 15 microns.

21. The method for making a filter of claim 20 wherein said hexagonal BN has a particle size of at least 5 micron to no more than 14 microns.

22. The method for making a filter of claim 11 wherein said $Y_2O_3$ has a particle size of less than 2 microns.

23. The method for making a filter of claim 11 wherein said coating has a thickness of at least 1 microns to no more than 200 microns.

24. The method for making a filter of claim 23 wherein said coating is BN with a coating thickness of at least 1 micron to no more than 50 microns.

25. The method for making a filter of claim 23 wherein said coating is $Y_2O_3$ with a coating thickness of at least 2 microns to no more than 50 microns.

26. The method for making a filter of claim 11 wherein said open cell foam has a porosity of at least 10 ppi to no more than 70 ppi.

27. The method for making a filter of claim 11 wherein said open cell foam is polyurethane.

28. The method for making a filter of claim 11 wherein said slurry further comprises at least one additive selected from the group consisting of inorganic filler, solvent, surfactant and sintering aid.

* * * * *

UNITED STATES PATENT AND TRADEMARK OFFICE
CERTIFICATE OF CORRECTION

PATENT NO. : 9,504,944 B2
APPLICATION NO. : 14/296922
DATED : November 29, 2016
INVENTOR(S) : Leonard S. Aubrey, Feng Chi and Lucas Damoah It is certified that error appears in the above-identified patent and that said Letters Patent is hereby corrected as shown below:

In the Specification

At Column 6. Lines 53-56 please change:
"FIG. 2 is a scanning electron micrograph of the boron nitride coated alumina filter after corrosion testing showing the alumina filter structure as well protected by the boron nitride."

To:
"FIG. 2 is an SEM image of a polished cross-section of a boron nitride coated alumina filter used to filter molten AL-LI."

Signed and Sealed this
Thirteenth Day of November, 2018

Andrei Iancu
*Director of the United States Patent and Trademark Office*